Oct. 28, 1947.    R. C. HARRINGTON, JR    2,429,620
DIVE ANGLE INDICATOR
Filed Feb. 17, 1945
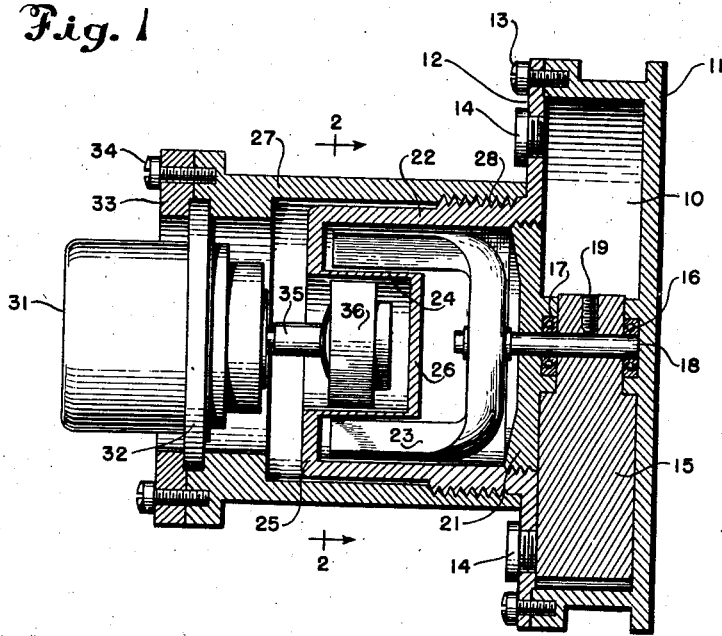
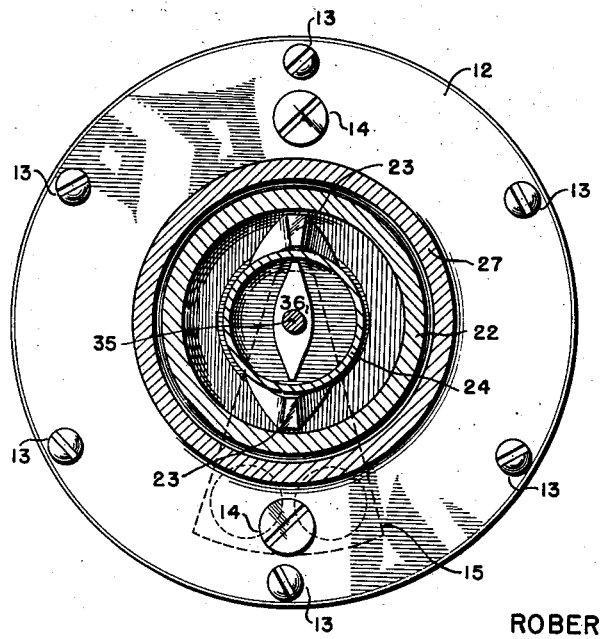
INVENTOR.
ROBERT C. HARRINGTON JR.
BY
Ralph L Chappell Patented Oct. 28, 1947

2,429,620

UNITED STATES PATENT OFFICE 2,429,620

DIVE ANGLE INDICATOR

Robert C. Harrington, Jr., United States Navy

Application February 17, 1945, Serial No. 578,425
2 Claims. (Cl. 33—215)

(Granted under the act of March 3, 1883, as amended April 30, 1928; 370 O. G. 757)

The present invention relates to aircraft instruments and more particularly to a transmitting unit of a dive angle indicator.

In the operation of military aircraft in dive bombing or rocket launching operations it is desirable to provide the pilot with an accurate visual indication of the angle of dive so that he may maintain his plane at a known dive angle with respect to the target. One arrangement for presenting dive angle information to the pilot so that it will appear on the reticule of his bombing sight has been disclosed in my co-pending application on a dive bombing sight, Serial No. 578,758, filed February 19, 1945, and it is a purpose of the mechanism described and claimed in the present disclosure to measure the angular position of the plane with respect to the earth and to electrically transmit the information to a unit such as described in the above-mentioned application.

Devices intended for measuring the dive angle of an aircraft consist essentially of a pendulum together with means for indicating the relative angle between the pendulum and the longitudinal axis of the plane. In devices of this sort commonly used in the past, however, the mechanical design and construction has been unsatisfactory in that the shock and vibration encountered in an aircraft prevent satisfactory functioning of the devices.

It is, therefore, one of the principal objects of the present invention to provide a dive angle transmitter unit of simple mechanical design, characterized by an unusual ruggedness of construction and a high degree of dependability of operation.

A further object of the invention resides in the provision of a dive angle indicator including a pendulum closely fitted into a circular fluid chamber and rotatable in one plane in the fluid chamber so that the fluid within the chamber acts as a damping agent for the pendulum.

A further object of the invention resides in the provision of a dive angle indicator including a pendulum mounted entirely within a sealed fluid chamber together with magnetic coupling means whereby an indication of the position of the pendulum is transmitted to an electrical follower system outside of the sealed pendulum chamber. Further objects of the invention will appear in connection with the description of the embodiment of the device illustrated in the drawings.

In the drawing,

Figure 1 is a central sectional view of the dive angle indicator unit.

Figure 2 is a detailed sectional view taken substantially on the plane of the line 2—2 in Figure 1.

The device includes a circular cylindrical pendulum chamber 10 formed of a main housing 11 which has its open side closed by sealing plate 12. The sealing plate 12 is secured in position by a number of cap screws 13 and one or more removable filler plugs 14 are provided in the plate so that the chamber 10 may be filled with liquid.

The pendulum 15 is of general wedge shape formation as indicated in dotted lines in Figure 2 and is mounted for rotation in the chamber by means of a pair of ball bearing assemblies 16 and 17 supporting a central shaft 18. The shaft 18 and pendulum 15 are secured to each other by a set screw 19. The bearing 16 is mounted in the center of the main housing 11 while the bearing 17 is carried by a center plate 21 threaded into an external sleeve extending outwardly from the face plate 12 to provide a cylindrical housing for a horseshoe magnet 23 carried at the outer end of the central shaft 18. The external sleeve 22 extends to a point just beyond the poles of the magnet and supports a thin internal sleeve 24 in the center of the end portion 25. The inner end of the internal cylindrical housing 24 is closed by the flat portion 26 so that while one cylinder lies within the other they are completely sealed apart and act to prevent any liquid from the chamber 10 from finding its way outside of the sealed portion of the device.

The external sleeve 22 also carries outer housing 27 mounted on the sleeve by the threads 28, in order to support the transmitter unit of a self-synchronous follower system. This is preferably of the type known in the trade as "Selsyn" or "autosyn" system, including a generator and motor electrically connected so that when the shaft of the generator is moved to a given position the shaft of the motor will assume the same position.

The Selsyn generator 31 includes a circular flange 32 clamped to the housing 27 by a ring 33 and screws 34 so that the axis of the motor shaft 35 will be substantially concentric with the axis of the shaft 18. The Selsyn shaft 35 extends into the internal cylinder 24 and carries a bar magnet 36 so that the bar magnet assumes a position directly between the opposite poles of the horseshoe magnet 23.

In operation, the device is mounted in any convenient location in an aircraft and is positioned so that the axis of the shaft 18 lies in a horizontal position and extends transversely across the longitudinal axis of the plane. Thus, the force of gravity will normally cause the pendulum 15 to hang directly downwardly and any changes in the angle of dive or climb of the plane will rotate the entire housing with respect to the pendulum. The relative motion between the pendulum and the housing will cause the magnet to be moved with relation to the housing and the magnetic attraction between the horseshoe magnet 23 and the bar magnet 36 will rotate the shaft 35 in the Selsyn 31 so that a Selsyn repeater located at a point remote from the transmitting unit can move a calibrated dial to present a visual indication of the angle of dive of the plane. The present disclosure is concerned with the transmitting unit of the dive angle indicator rather than with the indicator dial, but it contemplates the use of a repeater indicator, one form of which is shown in my co-pending application previously referred to.

By utilizing the teachings of this invention it is possible to provide a dive angle transmitting unit of unusual ruggedness and sound mechanical design. The combination of the pendulum and its closely fitting chamber, together with the liquid therein, provide smooth and dependable readings on the indicator in spite of unfavorable atmospheric conditions or prolonged violent vibration. Further, the combination of all of these parts with a magnetic coupling device provides a perfect seal for the working parts of the mechanism and a frictionless coupling between the mechanisms lying within the sealed chamber and those associated with the Selsyn generator.

A present preferred structure of the invention has been shown as the best illustration of the inventive thought, though it is subject to numerous modifications and variations coming within the scope of the appended claims.

The invention described herein, if patented, may be used by or for the Government for governmental purposes without the payment to me of any royalty thereon.

Having thus described the invention, what I claim as new and desire to secure by Letters Patent is:

1. A dive angle transmitter unit including a circular fluid chamber having a face plate formed to include an external cylinder and an internal cylinder, said internal and external cylinders being positioned within each other and closed at their opposite ends to provide an uninterrupted imperforate wall between them: a bar magnet positioned within the internal cylinder to actuate indicating means; a horseshoe magnet positioned within the external cylinder and outside of the internal cylinder and pivoted to rotate its opposite poles about said internal cylinder and thus control the position of the bar magnet; together with a pendulum housed within the first mentioned fluid chamber and means to rotate the horseshoe magnet in response to relative movements between the pendulum and the fluid chamber.

2. A dive angle transmitter unit including a sealed cylindrical fluid chamber and a cylindrical casing adapted to house an electrical transmitting unit fixed to said chamber and axially aligned therewith; an uninterrupted imperforate wall between the fluid chamber and the casing; a magnet rotatably mounted within the casing and adapted to be operatively connected to the electrical transmitting unit; a second magnet positioned within the sealed fluid chamber and mounted to rotate on an axis aligned with the axis of rotation of the first magnet, a pendulum housed within the first mentioned fluid chamber, and means to rotate the second magnet in response to relative movements between the pendulum and the fluid chamber.

ROBERT C. HARRINGTON, Jr.

REFERENCES CITED

The following references are of record in the file of this patent:

UNITED STATES PATENTS

| Number | Name | Date |
|---|---|---|
| 1,119,648 | Sheldon | Dec. 1, 1914 |
| 1,433,102 | Sperry | Oct. 24, 1922 |

FOREIGN PATENTS

| Number | Country | Date |
|---|---|---|
| 450,660 | Great Britain | July 22, 1936 |
| 515,733 | Great Britain | Dec. 13, 1939 |